June 23, 1970 H. S. FRANCK 3,516,566
FOAM STOP
Filed Oct. 11, 1967
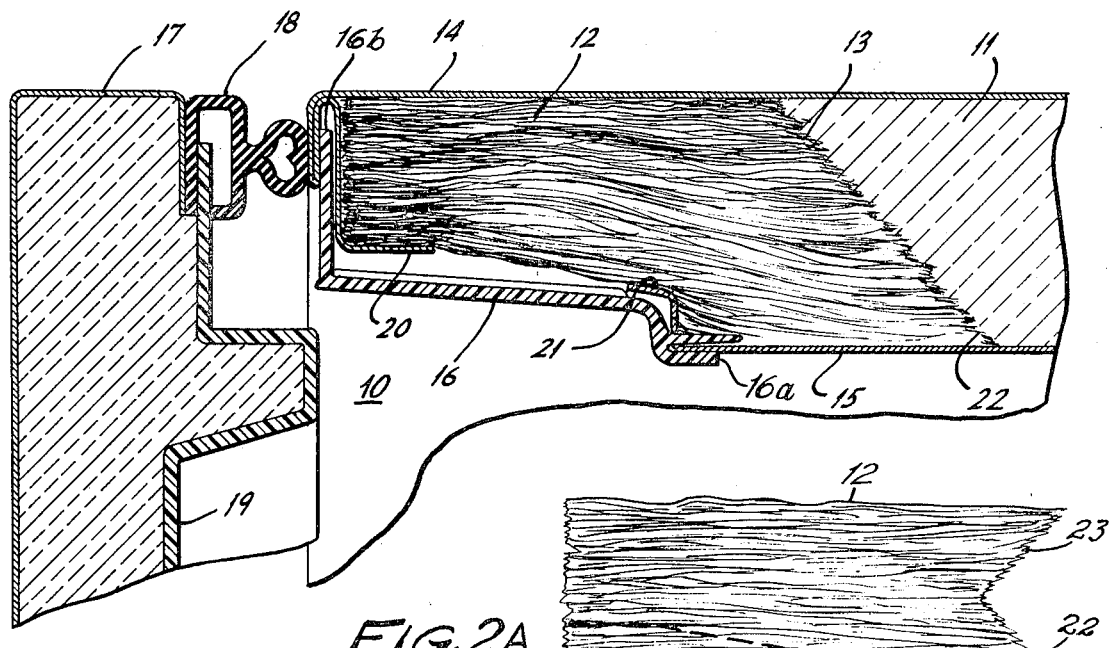
FIG. 1
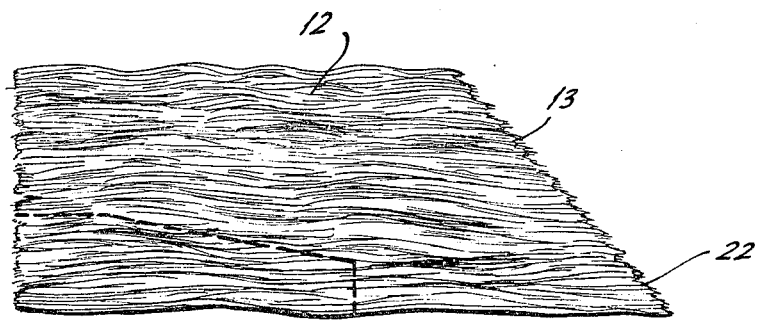
FIG. 2A
FIG. 2.
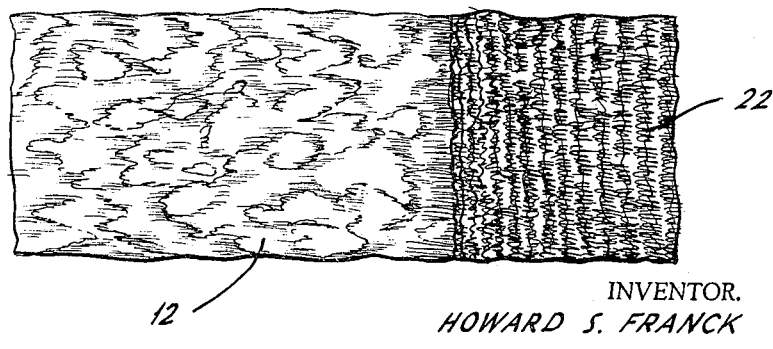
FIG. 3.
INVENTOR.
HOWARD S. FRANCK
BY
Frank D. Prager
ATTORNEY

United States Patent Office 3,516,566
Patented June 23, 1970

3,516,566
FOAM STOP
Howard S. Franck, Oxford, Ohio, assignor to Philco-Ford Corporation, Philadelphia, Pa., a corporation of Delaware
Filed Oct. 11, 1967, Ser. No. 674,562
Int. Cl. B65d 25/18
U.S. Cl. 220—9
3 Claims

ABSTRACT OF THE DISCLOSURE

Foam stop for precisely delimiting the flow of expanding foam in the construction of heat-insulating cabinet walls.

Summary of background and invention

The invention relates to the construction of heat-insulating walls for cabinets such as those of refrigerators.

Heretofore, heat-insulating foam has found increasing and generally successful use in such wall constructions but undesired penetration of foam has often occurred, particularly near the breaker strips of refrigerator walls. Attempts were made to stop this penetration of foam, but little success was achieved thus far. The penetration of foam can interfere seriously with the mounting of controls, wiring and the like, especially back of the breaker strip. The foam penetration has also complicated the construction and assembly of the breaker strip region itself.

The invention overcomes this difficulty by providing a new foam stop member, having an end section of wedge-shaped configuration. This configuration causes the expanding foam itself to press an end part of the foam stop against the liner of the cabinet wall, thereby delimiting and stopping the flow of the expanding foam.

Brief description of the drawing

FIG. 1 is a fragmentary view, taken in vertical cross-section through an upper portion of a refrigerator incorporating the present invention. It shows the new foam stop member, and part of the foam engaging it. FIG. 2 is a generally similar view of the foam stop member, alone, prior to installation and use. FIG. 2A is a modified form of the foam stop member. FIG. 3 is a plan view of a short piece of the foam stop member shown in elevation in FIG. 2.

Description of the preferred embodiment

The walls of refrigerator 10 are thermally insulated by foam material 11, which is incorporated in these walls by the known procedure of foam expansion. As already noted it is necessary to control the flow of the expanding foam, and for this purpose the invention provides a new and improved foam stop member 12. This member has, within the refrigerator wall, an end or edge portion providing a bevelled or wedge-like surface 13, extending between outer shell 14 and inner liner 15 of the refrigerator wall, a short distance from breaker strip 16. This wedge-like surface 13 is first engaged by foam 11 when foam expands in the wall structure.

It will be understood that foam stop members 12 are advantageously used in the several walls of the refrigerator, and can be used also in other types of cabinets. The new construction keeps the breaker strip region safely free from penetration of foam, thereby preventing difficulties due to escape of foam at the edges 16a, 16b of the breaker strip. It does not in any way interfere with the use of other equipment, such for instance as a front door 17 having the usual inner liner 19 and some suitable sealing gasket 18 bearing against the front flange of shell 14. (The sealing gasket illustrated here is that disclosed in Pat. 3,157,306, granted Nov. 17, 1964 on application of Iber C. Courson and assigned to the assignee of the present invention.)

In the process of constructing a refrigerator incorporating the present invention, a foam stop pad or strip 12 is initially provided in the form shown by full lines in FIG. 2. A short length of the strip is shown in FIG. 3, it being understood that the member extends along the wall between the confronting edges of the shell and liner, that is, vertically to the plane of the drawing in FIG. 1. The thickness of the pad or strip, shown vertically in FIG. 1, is such that it tends to fill the room between shell 14 and liner 15 near the breaker strip. The width of the pad or strip, horizontally in FIG. 1, at least slightly exceeds the extension of breaker strip 16 along the inside of wall 14, 15. The pad or strip consists of flexible material impervious to expanding foam 11. Advantageously it is constructed of laminated fibrous layers, as indicated in the drawing. It can comprise a pad of interconnected felted layers of fiberglass or glass wool. The material is commercially available in form of pods or sheets of generally rectangular cross-section. It is readily brought into the new wedge form, provided by this invention, by cutting such a sheet along an inclined line 13.

The opposite, generally square-ended portion of strip-like pad 12 is then compacted—against the slight resilient resistance offered by the material—into the approximate form shown by a broken line in FIG. 2. The compacted end so provided is clamped into a suitable metallic holder unit 20, FIG. 1, provided inside the space between shell 14 and liner 15 adjacent breaker strip 16. It is known from earlier practice how to interconnect such holder, liner and breaker strip members, and their construction is believed to be clear from the drawing. This also applies to the interconnection between the inner liner and the breaker strip, effected by a specially shaped portion 21 of liner 15. These structures, as heretofore employed, do not substantially interfere with the insertion of the new foam stop and need not be modified to permit such insertion.

When the new foam stop has been installed, foam 11 is expanded by conventional procedures, described for instance by Russell M. Henrickson in Pat. 3,099,516, granted July 30, 1963. In such a procedure gas is formed in a plastic mixture to make the material foam. Various catalysts, emulsifiers, and other agents are often employed to control the foaming and consequent expansion of the material, the flow thereof pursuant to such expansion, and the ultimate condition of the material when it has been solidified, for instance the formation of a solid skin surrounding a porous interior. A charge of the foam reactants is deposited in hollow wall 14, 15, somewhere to the right of foam stop 12 in FIG. 1, it being possible in some processes simply to combine the reactants at room temperature and to cause their expansion by bringing them together in the refrigerator wall cavity, or immediately prior to their introduction into the same. A certain time, such as 30 seconds or a minute, elapses before the reaction commences.

Some further time, for instance three minutes, then elapses before the foam arrives at foam stop 12. As the foam arrives here, it proceeds through the space between shell 14 and liner 15 in form of a space-filling column with irregular front surface. It rapidly contacts the wedge-formed stop surface 13, which is exposed to said space. Because of the thinness of this surface near its forward end 22, the arriving foam driven by expansion of gas within its own mass and in the foam masses behind it, presses front end or edge 22 toward liner 15 and thereby prevents the escape of foam into and from the space adjacent breaker strip 16. The trouble encountered in former operations is thus overcome.

In certain cases it may be preferable to modify the construction of the stop member in the way shown in FIG. 2A, by providing a second wedge shaped portion 23. This is desirable where it is advantageous to add and utilize a component of force pressing the stop member against the outer shell 14.

I claim:

1. A refrigerator wall having spaced, metallic shell and liner structures defining a hollow space in said wall, a heat-insulative breaker strip extending between front portions of said structures and secured to said front portions by edge portions of the strip, a body of heat-insulative foam in said space, between said structures, a flexible foam stop extending across the full width of said space, between said structures, and also extending, from adjacent and behind said breaker strip, a distance greater than said width, into said space and into contact with said body of foam, so as to cover said edge portions, said foam stop having a side disposed obliquely to said shell and liner structures in and traversing said space, which side has a terminal edge in contact with the inside of one of said structures, whereby the foam presses said terminal edge against said inside to keep the foam away from said edge portions and breaker strip.

2. A foam stop as described in claim 1 wherein said oblique side extends from one of said structures to the other.

3. A foam stop as described in claim 1 wherein said oblique side extends from one of said structures halfway to the other, said foam stop having a second oblique side symmetrical to the first.

References Cited

UNITED STATES PATENTS

| | | | |
|---|---|---|---|
| 3,037,652 | 6/1962 | Wallace | 220—9 |
| 3,362,560 | 1/1968 | Burrus et al. | 220—9 |

JOSEPH R. LECLAIR, Primary Examiner

J. R. GARRETT, Assistant Examiner